May 15, 1951        R. R. ROESCHEISE        2,553,147
PIPE CUTTING MACHINE
Filed July 5, 1949        2 Sheets-Sheet 1
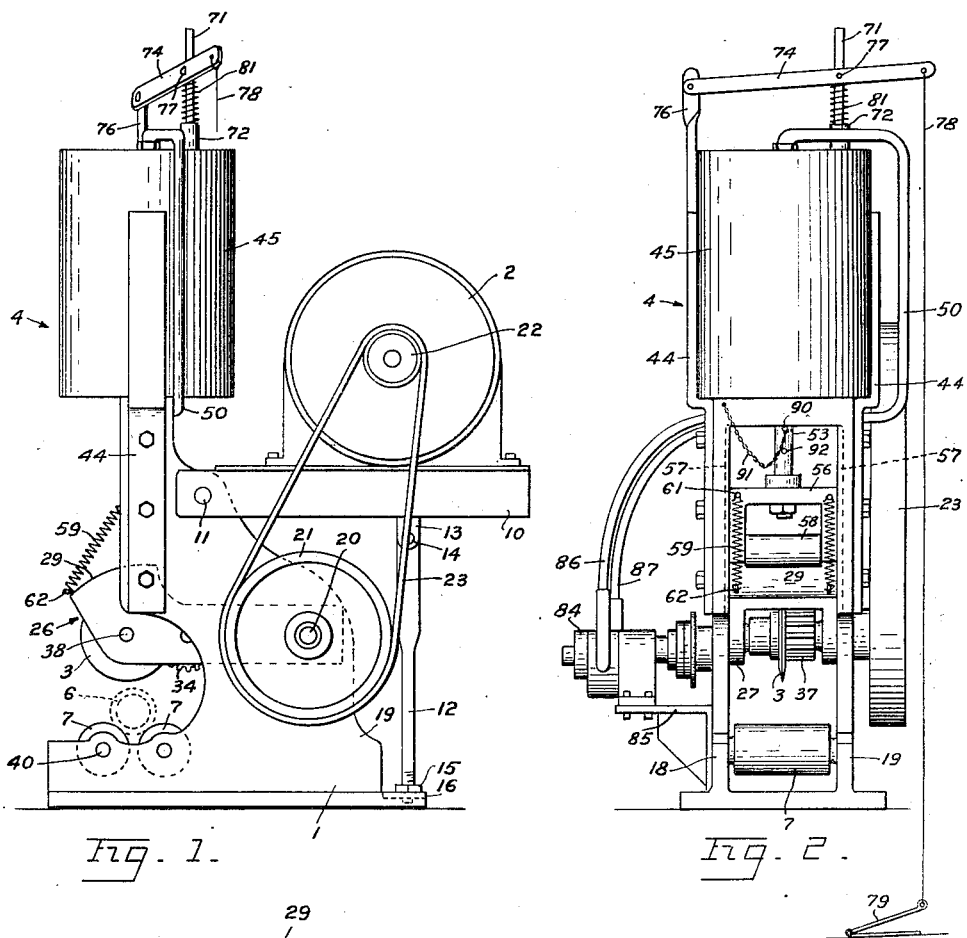
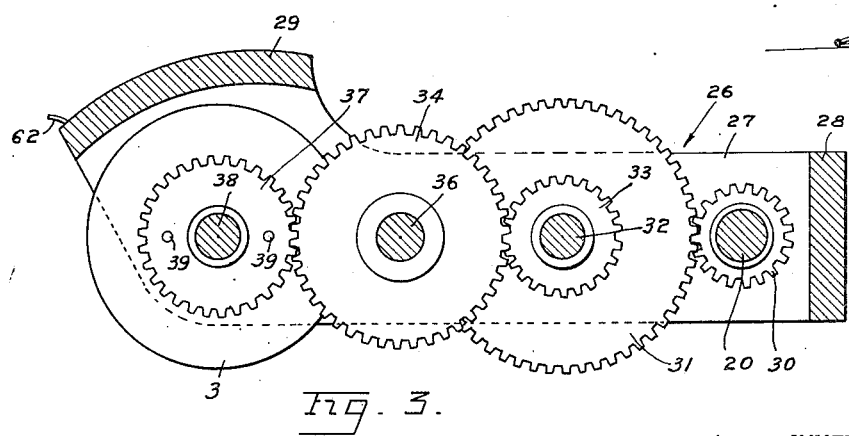
INVENTOR.
RAYMOND R. ROESCHEISE
BY Alexander Riaboff
ATTORNEY May 15, 1951 R. R. ROESCHEISE 2,553,147
PIPE CUTTING MACHINE
Filed July 5, 1949 2 Sheets-Sheet 2
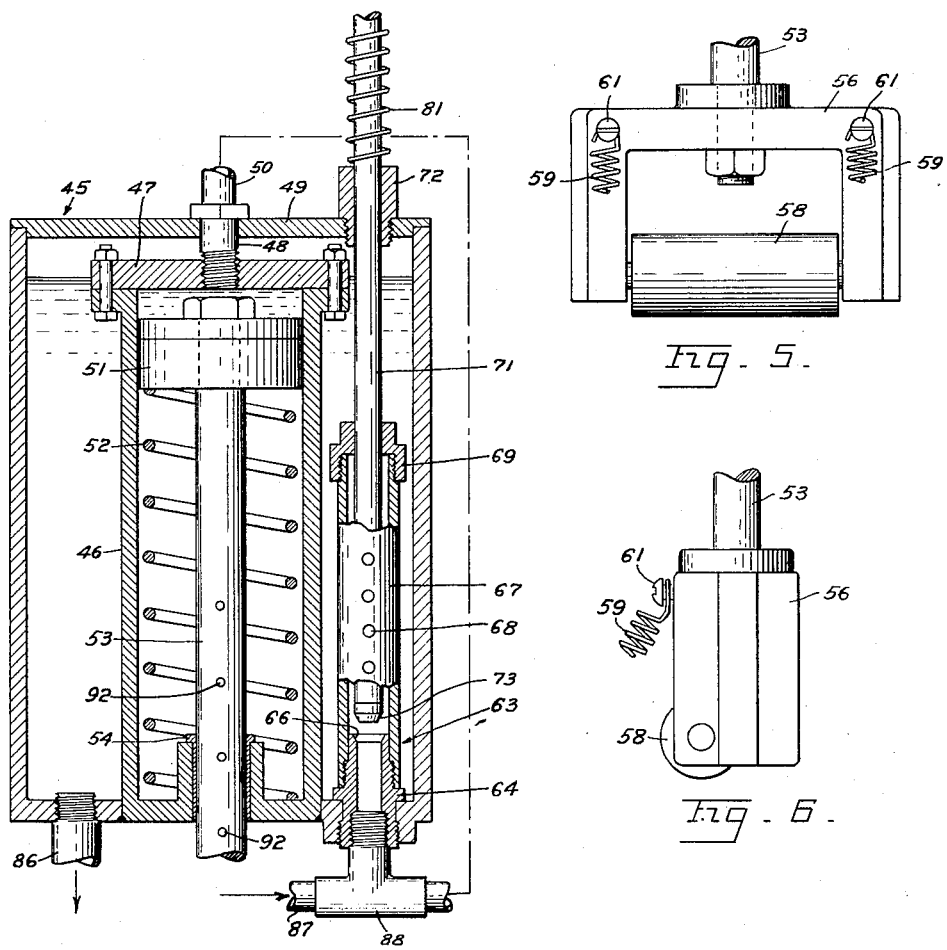
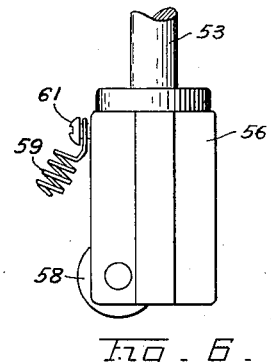
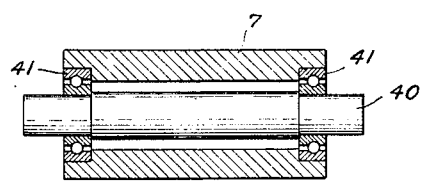
INVENTOR.
RAYMOND R. ROESCHEISE
BY Alexander Riaboff
ATTORNEY Patented May 15, 1951

2,553,147

UNITED STATES PATENT OFFICE 2,553,147

PIPE-CUTTING MACHINE

Raymond R. Roescheise, San Francisco, Calif.

Application July 5, 1949, Serial No. 103,014

4 Claims. (Cl. 164—60)

This invention relates to a pipe cutting machine and has for its object to provide a power driven pipe cutting machine which is simple, efficient and reliable.

Another object of this invention is to provide a pipe cutting machine having a circular power driven cutter wheel and hydraulic means for forcing said cutter wheel through the wall of a pipe to be cut.

Another object of this invention is to provide a pipe cutting machine adapted to cut pipes of different diameters.

Another object of this invention is to provide a pipe cutting machine wherein a pipe is rotated by the power driven circular cutter wheel during the process of cutting, said cutter wheel being forced into the wall of said pipe by hydraulic means.

Other objects and advantages will appear as the specification proceeds and the novel features of the device will be particularly pointed out in the claims hereto annexed.

This invention is illustrated in the accompanying drawings forming a part of this specification in which:

Fig. 1 is a side view of the pipe cutting machine.

Fig. 2 is a front view of the same.

Fig. 3 is a longitudinal vertical cross-section through a gear box.

Fig. 4 is a central vertical cross-section through an oil cylinder.

Fig. 5 is a front view of the yoke and the roller.

Fig. 6 is a side view of the yoke and the roller, and

Fig. 7 is a longitudinal cross-section of a pipe supporting roller.

In detail the pipe cutting machine shown in the drawings, consists of a frame 1 supporting a motor 2, a pipe cutter wheel 3 and means for rotating the same, and a hydraulic means 4 for forcing said cutter wheel onto a pipe 6 to be cut. The latter while being cut, rests on a pair of parallel freely rotating rollers 7, arranged at a right angle to said cutter wheel 3 and in close proximity to each other. When the rotating cutter wheel 3 contacts the pipe 6, the latter begins to rotate on said rollers 7, thus permitting the cutter wheel to enter into the wall of the pipe and cut the same through, making a clean circular cut.

The motor 2 is supported by a platform 10, one end of which is fulcrumed to the frame 1 at 11 and the other end is adjustably supported by a post 12 the upper end of which is connected to a lug 13 by a pin 14. The lower end of said post is threaded and carries a nut 15 resting on the bottom plate 16 of said frame. By adjusting the nut 15, the platform 10 may be swung upwardly or downwardly.

The frame 1 includes two vertical sides 18 and 19, which are pierced by a horizontal shaft 20. The latter bears a wheel 21 fixedly attached to the end thereof protruding beyond the side 19. The wheel 21 is rotated by the motor 2 through a small wheel 22 carried by said motor and a belt 23 operatively connecting said wheels 21 and 22. By raising or lowering the platform 10 the tension of the belt 23 may be adjusted.

The shaft 20 carries thereon a gear box 26. The latter consists of two parallel sides 27 connected by a back wall 28 and a rounded head 29.

The gear box 26 is located between the sides 18 and 19 of the frame 1 and is swingable about the shaft 20 which pierces both sides 27.

A small gear 30 is affixed to said shaft 20 between the gear box sides 27, which gear is in mesh with a large gear 31 affixed to a shaft 32 carried by said gear box. The latter shaft carries affixed thereto a small gear 33 which meshes with a large gear 34 carried by a shaft 36. The gear 34 meshes with a gear 37 on a shaft 38 located in the front part of said gear box 26.

The gear 37 is secured to the cutter wheel 3 by the pins 39 and rotates with the latter. Said gear 37 and cutter wheel 3 are located directly under the head 29.

Under the cutter wheel 3 there are provided the rollers 7, which support the pipe 6 during the cutting operation. The rollers 7 rotate around shafts 40 carried by the sides 18 and 19. Ball bearings 41 are interposed between said rollers and shafts, thus minimizing friction therebetween.

The pipe 6, resting on said rollers 7, begins to rotate immediately upon being contacted by the rotating cutter wheel 3 thus permitting the latter to enter into and gradually cut through the wall of the pipe 6, making an even circular cut.

Hydraulic means 4 are provided for swinging said head box 26 downwardly and for forcing the cutter 3 onto the pipe 6. Said means consists of a reservoir 45 which rests on the top of the frame 1 and is attached thereto by supports 44. The reservoir contains an operating cylinder 46 which is hermetically closed by a cover 47. A nipple 48 is provided in said cover 47, which nipple pierces a reservoir cover 49. The nipple 48 is connected to an oil tube 50 through which oil is delivered into said cylinder and exhausted therefrom, as hereinafter shall be explained in detail.

The cylinder 46 contains a reciprocating piston 51 which is adapted to move downwardly under the pressure of oil delivered into the top of said cylinder through the nipple 48, said downward movement of the piston being against the action of a compression spring 52. The latter is interposed between the piston 51 and the bottom of said cylinder and yieldingly urges said piston upwardly. The spring 52 is strong enough in the absence of the oil pressure upon the piston, to force the same and all parts associated therewith upwardly and to force oil in the cylinder out of the latter through the nipple 48.

The piston 51 carries a shaft 53 passing through a bushing 54 in the bottom of said cylinder 46. The lower end of said shaft is attached to a yoke 56 slidable in the grooves 57 provided on the inner surfaces of the sides 18 and 19. The yoke 56 carries a roller 58 which contacts the upper surface of the head 29 of the gear box 26. The contact between said roller 58 and said head 29 is maintained by two coil springs 59, the upper ends of which are attached to the yoke 56 by screws 61, and the lower ends to the head 29 by pins 62.

The yoke 56, while moving downwardly, presses the roller 58 against the head 29 and forces the gear box 26 to swing downwardly.

The flow of oil into the cylinder 46 is controlled by a control valve 63 arranged in the reservoir 45. The valve 63 consists of a fitting 64 screwed into the bottom of the reservoir 45 and having a valve face 66 in the top thereof.

The fitting 64 is externally threaded to enter the internally threaded end of a tubular member 67. The latter is provided with a plurality of perforations 68 and has its top closed by a valve bushing 69. A valve stem 71 passes through said bushing 69 and extends upwardly through a second bushing 72 arranged in the reservoir cover 49. The lower end of the valve stem terminates in close proximity with the valve face 66 and is formed with a valve seat 73 adapted to set on said valve seat and thereby close the access into said tubular member through said fitting 64.

A lever 74 is provided for the purposes of operating the stem 71, one end of said lever being fulcrumed to a post 76 carried by the reservoir 45. The top of the stem 71 is fulcrumed to said lever at 77, and the free end thereof is connected by a wire 78 to a foot pedal 79. When an operator presses the foot pedal 79, the lever 74 forces the stem 71 downwardly against the resistance of the coil spring 81 provided around said stem between the bushing 72 and the lever 74. The downward movement of the stem 71 either completely or partially closes the valve 63, and either completely stops or impedes the flow of oil through said valve into said reservoir.

Oil is pumped into the operating cylinder 46 and out of the reservoir 45 by an oil pump 84. The latter is supported by a platform 85 attached to the side 18 of the frame 1. The pump 84 is operated by the shaft 20 which extends beyond the side 18 and is operatively connected to said pump. The latter is connected to the bottom of the reservoir 45 by an oil conduct 86 which serves only as a passage for oil from said reservoir to said oil pump. A conduit 87 delivers oil from the pump to the T-fitting 88 which is connected with the valve 63. The other end of the T-fitting is connected to the tube 50 leading to the nipple 48.

The device operates as follows: The motor 2 is started. It operates the shaft 20 and associated therewith the pump 84 and the cutter wheel 3. Oil is pumped into the conduit 87 and it passes through the valve 63 back into the reservoir 45, as long as said valve is open.

A pipe to be cut is placed on the rollers 7 and the foot pedal 79 is pressed downwardly, thus closing the valve 63 and forcing oil through the pipe 50 into the cylinder 46. The piston 51 and the yoke 56 associated therewith move downwardly and through the roller 58 force the gear box 26 to swing downwardly. When the rotating cutter wheel 3 touches the pipe, the latter starts to rotate. The constant pressure of the roller 58 upon the gear box head 29 forces the cutter wheel 3 into the wall of the pipe and cuts the same accurately and quickly. When the foot pedal 79 is released, the valve becomes open, and the spring 52 moves the piston 51, the yoke 56 and the gear box 26 upwardly, and forces oil from the cylinder 46 through the pipe 50 into the valve 63 and reservoir 45.

When it is desired to make repeated cuts off a pipe of the same comparatively small diameter, it is not necessary to raise the cutter wheel 3 to its uppermost position after each cut. The upper movement of the piston 51 may be stopped by a pin 90 attached to the frame 1 by a chain 91 which pin may be inserted into one of the several holes 92 provided for that purpose in the shaft 53. When the pin 90 comes in contact with the frame 1, the upward movement of the piston 51 and associated therewith cutter wheel 3 is stopped, and the downward motion of said cutter wheel starts from that position immediately upon pressing of the foot pedal 79.

I claim:

1. A pipe cutting machine comprising a frame, a motor, a swingable gear box operatively connected with said motor, a cutter wheel carried by the free end of said gear box and adapted to be rotated by said motor through said gear box, a pair of freely rotating rollers adapted to support a pipe to be cut and located under said cutter wheel, and means for swinging said gear box downwardly including an oil pump, a cylinder, a piston in said cylinder, a controlling valve for controlling the flow of oil from said pump into said cylinder and out of the same, a yoke operatively connected to said piston, a roller carried by said yoke and adapted to ride on said gear box, said piston being adapted to move downwardly by the action of said oil pump, and spring means for moving the piston and the gear box upwardly.

2. A pipe cutting machine comprising a frame, a motor, a swingable gear box operatively connected with said motor, a cutter wheel carried by the free end of said gear box and adapted to be rotated by said motor through said gear box, a pair of freely rotating rollers adapted to support a pipe to be cut, and located under said cutter wheel, and means for swinging said gear box downwardly including an oil pump, a cylinder, a piston in said cylinder, a controlling valve, a conduit connecting said pump with said valve for passing fluid from said pump to said valve, a second conduit connected to the first one and directing fluid from said pump to the top of said cylinder when the valve is closed, a yoke, a shaft connecting said piston and said yoke, a roller carried by said yoke and adapted to ride on said gear box, said piston being adapted to move downwardly under the pressure of fluid pumped into the cylinder by said pump, and spring means for moving said piston and gear box upwardly.

3. A pipe cutting machine comprising a frame, a motor, a swingable gear box operatively connected with said motor, a cutter wheel carried by the free end of said gear box and adapted to be rotated by said motor through said gear box, a pair of freely rotating rollers adapted to support a pipe to be cut, and located under said cutter wheel, and means for swinging said gear box downwardly including an oil pump, a cylinder, a piston in said cylinder, a controlling valve, a conduit connecting said pump with said valve for passing fluid from said pump to said valve, a second conduit connected to the first one and directing fluid from said pump to the top of said cylinder when the valve is closed, a yoke adapted to slide downwardly and upwardly, a shaft connecting said piston and said yoke, a roller carried by said yoke and adapted to ride on said gear box, a pair of springs connecting said yoke and the gear box, and a spring in the cylinder for moving the piston, yoke and the gear box upwardly.

4. A pipe cutting machine comprising a frame, a motor, a swingable gear box operatively connected with said motor, a cutter wheel carried by the free end of said gear box and adapted to be rotated by said motor through said gear box, a pair of freely rotating rollers adapted to support a pipe to be cut and located under said cutter wheel, and means for swinging said gear box downwardly including an oil pump, a cylinder, a piston in said cylinder, a controlling valve, a conduit connecting said pump with said valve for passing fluid from said pump to said valve, a second conduit connected to the first one and directing fluid from said pump to the top of said cylinder when the valve is closed, a yoke adapted to slide downwardly and upwardly, a shaft connecting said piston and said yoke, a roller carried by said yoke and adapted to ride on said gear box, a pair of springs connecting said yoke and the gear box and means for stopping the upward movement of the piston at a desired height.

RAYMOND R. ROESCHEISE.

REFERENCES CITED

The following references are of record in the file of this patent:

UNITED STATES PATENTS

| Number | Name | Date |
| --- | --- | --- |
| 1,765,208 | Cunningham | June 17, 1930 |
| 1,801,038 | Ewing | Apr. 14, 1931 |